G. H. ECKMAN.
NUT LOCK.
APPLICATION FILED JAN. 27, 1913.
1,086,517. Patented Feb. 10, 1914.
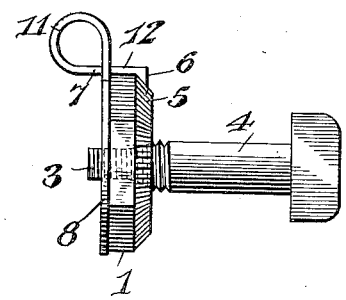
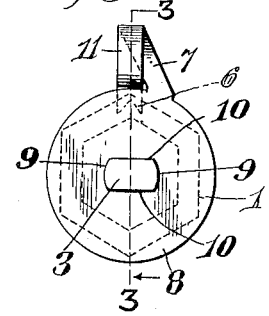
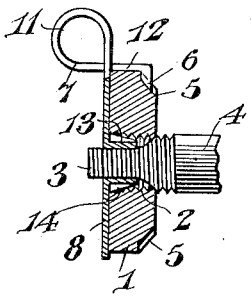
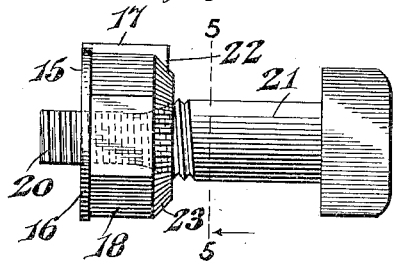
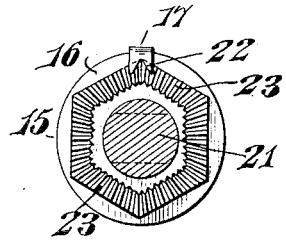
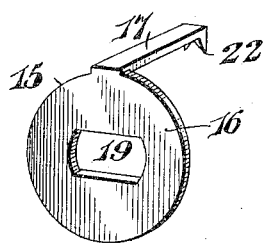
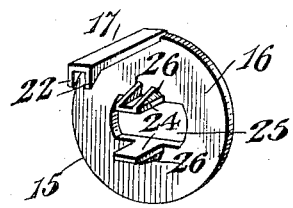
WITNESSES
George H. Eckman, INVENTOR
BY
ATTORNEY

UNITED STATES PATENT OFFICE.

GEORGE HERBERT ECKMAN, OF MARSHALLTOWN, IOWA.

NUT-LOCK.

1,086,517. Specification of Letters Patent. Patented Feb. 10, 1914.

Application filed January 27, 1913. Serial No. 744,518.

*To all whom it may concern:*

Be it known that I, GEORGE H. ECKMAN, a citizen of the United States, residing at Marshalltown, in the county of Marshall and State of Iowa, have invented a new and useful Nut-Lock, of which the following is a specification.

This invention relates to improvements in nut locks.

The object of the present invention is to improve the construction of nut locks, and to provide a simple, inexpensive and efficient device, designed for use on various kinds of machinery, railroads, bridge construction and the like, and adapted to enable a nut to be screwed home with the same facility as an ordinary nut, and capable of effectually preventing the same when subjected to vibration from accidentally unscrewing.

A further object of the invention is to provide a nut lock equipped with a locking spring or plate, adapted to be easily and quickly applied and removed from a bolt and nut and equipped with means for preventing vibratory movement, so that a nut will be securely locked in its adjustment.

With these and other objects in view, the invention consists in the construction and novel combination of parts hereinafter fully described, illustrated in the acompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a nut lock, constructed in accordance with this invention. Fig. 2 is a front elevation of the same. Fig. 3 is a longitudinal sectional view on the line 3—3 of Fig. 2. Fig. 4 is a side elevation of a nut lock, illustrating another form of the invention and showing the same applied to a thick nut. Fig. 5 is a transverse sectional view on the line 5—5 of Fig. 4. Fig. 6 is a perspective view of the locking device shown in Figs. 4 and 5. Fig. 7 is a similar view, showing the locking plate equipped with tapered inwardly projecting lugs or arms.

Like numerals of reference designate corresponding parts in all the figures of the drawing.

In the accompanying drawing in which is illustrated the preferred embodiment of the invention, 1 designates a nut of the thin type having the usual threaded opening 2 to enable it to screw on the threaded portion 3 of a bolt 4 in the usual manner. The outer edge of the nut is beveled at the inner or rear face, and is provided with inclined grooves 5, tapered or V-shaped in cross section and adapted to be engaged by a pair of tapered teeth or prongs 6 of a resilient dog 7, preferably formed integral with a locking plate 8. The top plate and the dog 7, which constitute a locking device for the nut, are preferably constructed of spring sheet metal, and the locking plate 8, which fits against the outer face of the nut, is provided with a polygonal opening 9 preferably bound by straight parallel side walls and curved connecting walls and adapted to fit flat side faces 10, formed by cutting away or reducing the outer threaded portion 3 of the bolt 4. The locking plate is fitted on the outer portion of the bolt, and its polygonal opening 9 conforms to the configuration of the bolt, whereby the locking plate is rigidly held against rotary movement on the bolt.

The resilient dog, which consists of a strip or extension of the plate 8, is bent adjacent to the plate to form a spring coil 11 and it has a straight portion 12 adjacent to the teeth or prongs 6 to fit against the peripheral edge of the nut, as clearly illustrated in Figs. 1 and 3 of the drawing. The teeth or prongs 6, which may be of any desired number, are arranged substantially at right angles to the straight portion 12, and they are tapered longitudinally and transversely with relation to the bolt and are adapted to engage in the radial groove of the beveled edge of the nut and when the locking device is snapped into engagement with the nut, the latter will be securely held against rotary movement and effectually prevented from accidentally unscrewing. The beveled edge and the grooves of the nut will enable the latter to be locked at any point, and the nut may be screwed on the bolt and adjusted similar to an ordinary nut. Also the locking device may without injury be readily removed from the bolt and nut when it is desired to adjust or remove the latter, and it is capable of re-use indefinitely.

When it is desired to obtain a rigid fit between the locking device and the nut to effectually prevent any vibratory movement of the parts, the locking plate may be equipped at the straight sides of its polygonal opening with a pair of tapered arms or lugs 13 formed integral with the locking plate. The lugs or arms, which extend into the space between the faces 10 of the bolt and the walls of the threaded opening 2 of the nut, are provided with side flanges 14, which are tapered from the inner or rear face of the plate 8 to render the arms or lugs wedge-shaped and enable them to be wedged in the bolt receiving opening of the nut, which will be firmly clamped by spring pressure between the inwardly extending tapered lugs or arms and the prongs or teeth of the resilient dog. Either or both of the tapered lugs or arms may, of course, be omitted and will not be employed in the simplest form of the nut lock.

In Figs. 4 to 6 inclusive is illustrated a locking device 15, consisting of a plate 16 and a straight locking dog 17 and designed especially for use on a thick nut 18, but the resilient locking dog heretofore described as having the spring coil may, of course, be employed on nuts of any size or thickness. The plate 16 is provided with a polygonal opening 19 to fit on the reduced portion 20 of a bolt 21. The plate 16 fits against the outer face of the nut 18 and the dog 17, which is resilient, fits against the peripheral edge of the nut and is of a length to extend from the front to the rear face of the same, and is provided at its rear end with projecting prongs or teeth 22 for engaging the grooved peripheral edge 23 of the thick nut 18. The locking action of the locking device shown in Figs. 4 to 6 inclusive is the same as that of the device heretofore described, and the resilient locking dog 17 is adapted to be readily sprung into and out of engagement with the nut.

The form of the locking device shown in Figs. 4 to 6 inclusive may, as illustrated in Fig. 7, be equipped with tapered lugs or arms 24, arranged at the sides of the bolt opening 25 and provided with tapered side flanges 26. The tapered lugs or arms are adapted to extend into the opening of the nut for preventing vibration of the locking device, as heretofore pointed out in connection with the form of the invention shown in Fig. 3.

What is claimed is:—

1. A nut lock of the class described comprising a bolt having a reduced threaded portion, a nut having a peripheral beveled edge at its rear face and provided in such beveled edge with inclined grooves, and a locking device including a plate fitted against the outer face of the nut and having a polygonal bolt receiving opening, and a resilient dog extending from the plate over the edge of the nut and provided with an inwardly projecting tooth or prong arranged to engage the inclined grooves of the beveled edge of the nut and adapted to be sprung outwardly to enable it to be applied to and removed from the bolt and nut.

2. A nut lock of the class described comprising a bolt having a reduced threaded portion, a nut having a peripheral beveled edge at its rear face and provided in such beveled edge with inclined grooves, and a locking device including a plate having a polygonal bolt receiving opening and arranged at the outer face of the nut, and a resilient dog extending across the peripheral edge of the nut and having a spring coil connecting it with the plate, said dog being also provided with an inwardly extending tooth or prong arranged to engage the grooves of the beveled peripheral edge of the nut.

3. A nut lock of the class described comprising a bolt having a reduced threaded portion forming a flat face, a nut, a locking device including a plate having a bolt receiving opening and provided at its outer edge with a dog arranged to engage the nut, said plate being also provided with an integral lug extending from the bolt receiving opening and presenting a flat face to the flat face of the bolt and provided at opposite sides with tapered flanges having inclined edges and extending into the nut and adapted to be wedged between the same and the bolt.

In testimony, that I claim the foregoing as my own, I have hereto affixed my signature in the presence of two witnesses.

GEORGE HERBERT ECKMAN.

Witnesses:
    CATHERINE A. TULLY,
    EDITH E. JEFFERY.

---

Copies of this patent may be obtained for five cents each, by addressing the "Commissioner of Patents, Washington, D. C."